July 15, 1969        J. H. ONIONS        3,455,558
LAMINATED GOLF CLUBS
Filed Nov. 26, 1965

INVENTOR
John Henry Onions
BY
Stevens, Davis, Miller & Mosher
ATTORNEYS

United States Patent Office 3,455,558
Patented July 15, 1969

3,455,558
LAMINATED GOLF CLUBS
John H. Onions, Alma House, Upper Spring Lane,
Kenilworth, Warwickshire, England
Filed Nov. 26, 1965, Ser. No. 509,921
Claims priority, application Great Britain, Dec. 8, 1964,
49,810/64
Int. Cl. A63b 53/08
U.S. Cl. 273—169                                      2 Claims

ABSTRACT OF THE DISCLOSURE

A matched set of golf clubs (woods) with each club having a head formed of alternating layers of wood and a synthetic plastic material such as acrylonitrile, butadiene styrene resin, with the matching swing weights of the clubs being achieved by varying the thickness of the wood and plastic layers from one club to another. The layers are arranged so that the edges of the layers form the striking face of the club head. No weights or cavities are required in the club heads in order to match them.

---

This invention relates to materials for use in the making of golf club heads and other articles, and also to golf club heads made from such materials.

It is, of course, evident that if an article such as a golf club head is made of two materials, one having a specific gravity such that a head made wholly of it would exceed the required weight, and the other having a specific gravity such that a head made wholly of it would fall short of the required weight, the proportions of the two materials can be selected to provide just the right weight, thus enabling the head to be made without added weights or cavities.

It is an object of the present invention to provide a laminated material which enables golf club heads to be so made, and is also suitable for the manufacture of other articles. It is another object of the invention to provide a golf club head made of such material.

A laminated material according to the present invention comprises alternate layers of plastics material and of natural wood or of sheet material formed of sawdust or wood powder and a binder. The plastics material may be acrylonitrile butadiene styrene resin, a known thermoplastic resin, and some or all of the layers of plastics material may be formed of expanded plastics material. Further, according to the invention, a golf club head is formed of material as set out in either of the last two preceding paragraphs.

The laminations of the laminated material forming the golf club head may be bent so as to lie substantially parallel to the sole of the club in the main part of the head, whilst the parts of said laminations in the hosel extend substantially parallel to the axis of the latter.

A laminated material according to the invention may comprise alternate sheets of wood veneer and of plastics material such as acrylonitrile butadiene styrene resin bonded together in any suitable manner. The wood veneer may be replaced by sheet material made up of sawdust, wood powder or like comminuted vegetable material with a binder.

Whilst the laminated material according to the invention is particularly suitable for use in the manufacture of golf club heads it may also be used in boats, electromechanical structures, transformers, insulators, panels for structural or decorative purposes and for many other uses.

The following description is concerned with golf club heads made from the said laminated material, and reference is made to the accompanying drawings in which.

Figure 1:
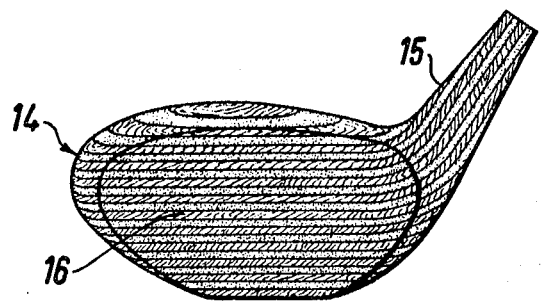
FIGURE 1 is a front view of a golf club head according to the invention.
Figure 2:
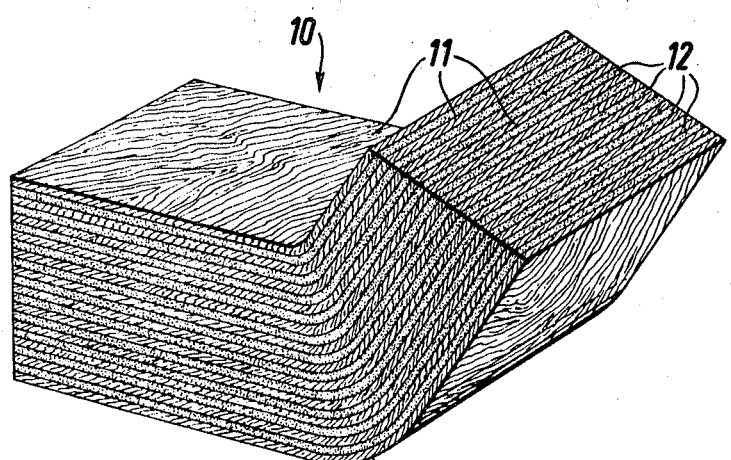
FIGURE 2 is a perspective view of a block of corrugated material from which a golf club head can be formed.

Referring to FIGURE 2, the block 10 of corrugated material comprises alternate layers of wood veneer 11 and plastics material 12, the layers 11 and 12 being bent at 13 so that the block is of open V-shape. A golf club head 14 (FIGURE 1) is formed from the block 10 by turning in the customary manner, the laminations of the material extending across the main part of the club head 14 in planes substantially parallel to the sole of the club, and, in the hosel 15, extending substantially parallel to the axis of the said hosel. The striking face 16 of the club is therefore formed by the edges of the laminations of the material, which extend horizontally across it.

The use of the laminated material according to the present invention for the manufacture of golf club heads enables the heads to be made of any desired weight without providing cavities such as are commonly provided when the heads are made of plastics material, which is relatively heavy, or adding lead weights such as are commonly used when the clubs are made of wood, which is relatively light. Using the laminated material, the required weight can be obtained by using laminations of wood and of plastics material having their relative thicknesses chosen so as to provide the desired total weight.

The advantages of the invention are particularly brought out by considering the group of golf clubs, commonly known as "Woods," usually comprising five clubs which, desirably, should have matching logarithmic swing-weights. Of these clubs, the driver or No. 1 has both the largest head and the longest shaft, and both the head sizes and the shaft lengths decrease progressively down to the cleek, No. 5. If the heads of the clubs forming the set are made wholly of wood, the smaller ones must be very heavily weighted with lead to bring their swing-weights up to that of the clubs with larger heads and longer shafts, whereas, if the said heads are made wholly of plastics material, the larger ones must have considerable cavities to reduce their swing-weights to correspond with the smaller clubs. Lead weighting of golf club heads is not highly satisfactory because wooden heads tend to swell and shrink with changes of atmospheric humidity, thus tending to loosen the weights, and large cavities may encroach on the portion of the head behind the driving face, which reduces driving efficiency.

A set of clubs (woods) made from the laminated material according to the present invention can be made to have the desired swing weights simply by varying the relative thickness of the wood and plastics laminations in the blocks from which the different heads are formed, the material of the driver head having relatively thick wood laminations and relatively thin plastic laminations, and the wood laminations becoming thinner, and the plastics laminations thicker as the heads become smaller.

By way of example, it might be found that, in the driver head the wood laminations should be one eighth of an inch thick and the plastics laminations one sixteenth of an inch thick, whereas in the cleek the wood laminations should be one sixteenth of an inch thick and the plastics laminations one eighth of an inch thick.

It is believed that the fact that the striking face of the club head is formed by the edges of the laminal extending horizontally across it provides very satisfactory conditions for striking the ball, and no face insert, such as is commonly used in golf club heads, would be needed.

Instead of varying the overall weight of the club heads by varying the relative thicknesses of the two materials constituting the laminations, the same result may be achieved by using expanded or "blown" plastics material for the plastics layers, the degree of expansion of the plastics material being so chosen that a required weight is achieved using plastics layers of the same thickness as the wood layers.

Instead of using natural wood for the wood layers, these may be formed of sheet material comprising sawdust or wood powder together with a binder, such material being already referred to herein.

The plastics layers in the laminated material may be coloured so as to contrast with the wooden layers, and different colours may be used to distinguish different clubs of a set.

I claim:

1. A golf club head comprising a main part having a lower sole surface and a hosel secured to said main part, said main part consisting essentially of a plurality of alternating layers of wood and a synthetic plastic resin, said layers extending across the main part of the club head in planes substantially parallel to the sole surface, and edges of said layers constituting a striking face of the club head, the relative thickness of the wood and plastic resin layers being predetermined to provide a predetermined total weight, said layers of wood and plastic being extended and bent so that portions of said layers from the hosel extend substantially parallel to the axis thereof.

2. A set of matched golf clubs wherein the improvement comprises each golf club having a laminated club head, each club head comprising a main part having a lower sole surface and a hosel secured to said main part, said main part consisting essentially of a plurality of alternating layers of wood and a synthetic plastic resin of a density different from that of said wood, said layers extending across the main part of the club head in planes substantially parallel to the sole surface, and edges of said layers constituting a striking face of the club head, the relative thicknesses of the wood and plastic resin layers in a respective club head differing from the thicknesses of the respective layers in the other club heads in predetermined sequence to provide golf clubs having matching swing weights.

References Cited

UNITED STATES PATENTS

| | | |
|---|---|---|
| 1,567,323 | 12/1925 | Jordan. |
| 2,307,193 | 1/1943 | Bellis _____ 273—78 |
| 2,316,880 | 4/1943 | Miller _____ 161—261 X |
| 2,880,002 | 3/1959 | Wetty _____ 273—167 X |
| 3,092,386 | 6/1963 | Dettman _____ 273—82 |
| 3,232,617 | 2/1966 | Satchell et al. _____ 273—82 |
| 3,317,363 | 5/1967 | Weber. |

FOREIGN PATENTS

| | | |
|---|---|---|
| 555,027 | 7/1943 | Great Britain. |

RICHARD C. PINKHAM, Primary Examiner

RICHARD J. APLEY, Assistant Examiner